US007230355B2

United States Patent
Lin et al.

(10) Patent No.: US 7,230,355 B2
(45) Date of Patent: Jun. 12, 2007

(54) LINEAR HYBRID BRUSHLESS SERVO MOTOR

(75) Inventors: Huai Lin, Castaic, CA (US); John Andrew Heilig, Santa Clara, CA (US)

(73) Assignee: Baldor Electric Company, Fort Smith, AR (US)

( * ) Notice: Subject to any disclaimer, the term of this patent is extended or adjusted under 35 U.S.C. 154(b) by 262 days.

(21) Appl. No.: 11/018,980

(22) Filed: Dec. 21, 2004

(65) Prior Publication Data

US 2006/0131967 A1   Jun. 22, 2006

(51) Int. Cl.
*H02K 41/00* (2006.01)
(52) U.S. Cl. ........................................ 310/12
(58) Field of Classification Search ............ 310/12–14, 310/216–218
See application file for complete search history.

(56) References Cited

U.S. PATENT DOCUMENTS

| | | |
|---|---|---|
| RE27,436 E | 7/1972 | Sawyer |
| 3,878,411 A * | 4/1975 | Nocito et al. .................. 310/12 |
| 3,950,663 A | 4/1976 | Mead |
| 4,078,192 A | 3/1978 | Fultz |
| 4,315,171 A | 2/1982 | Schaeffer |
| 4,335,338 A | 6/1982 | Sawyer |
| 4,404,509 A | 9/1983 | Hartwig |
| 4,509,001 A | 4/1985 | Wakabayashi et al. |
| 4,578,622 A * | 3/1986 | Nakagawa et al. ......... 318/138 |
| 4,661,730 A * | 4/1987 | Maruyama et al. ............ 310/12 |
| 4,725,750 A | 2/1988 | Welch |
| 4,749,921 A | 6/1988 | Chitayat |
| 4,757,220 A | 7/1988 | Pouillang |
| 4,912,746 A | 3/1990 | Oishi |
| 4,972,108 A | 11/1990 | Venturini |
| 5,010,262 A * | 4/1991 | Nakagawa et al. ........... 310/12 |
| 5,218,250 A * | 6/1993 | Nakagawa .................... 310/12 |
| 5,528,210 A * | 6/1996 | Huang et al. ................ 335/216 |
| 5,642,013 A | 6/1997 | Wavre |
| 5,723,917 A | 3/1998 | Chitayat |
| 5,910,691 A | 6/1999 | Wavre |
| 5,965,962 A | 10/1999 | Hinds |
| 6,069,417 A * | 5/2000 | Yuan et al. .................... 310/12 |
| 6,160,327 A | 12/2000 | Wang |
| 6,215,260 B1 | 4/2001 | Hinds |
| 6,242,822 B1 | 6/2001 | Strothmann |
| 6,522,035 B1 | 2/2003 | Smit |
| 6,674,186 B2 * | 1/2004 | Yajima et al. ................. 310/12 |
| 6,798,089 B1 | 9/2004 | Smit |
| 7,148,590 B1 * | 12/2006 | Lampson ...................... 310/12 |
| 2005/0173992 A1 * | 8/2005 | Yang et al. .................... 310/12 |

* cited by examiner

*Primary Examiner*—Thanh Lam
(74) *Attorney, Agent, or Firm*—Thompson Coburn LLP

(57) ABSTRACT

An improved linear hybrid brushless servo motor is disclosed. The motor comprises a forcer and a platen. The forcer has a plurality of stacks, permanent magnets, and coils which form a three-phase motor. The platen has a low cost ferromagnetic steel plate. The stacks, permanent magnets and phase coils of the forcer are specially designed to have the optimal electromagnetic coupling between the forcer and platen to achieve a high force density servomotor. In one embodiment, two E-shaped stacks are used to physically couple two phases to substantially minimize the unexpected cogging force and force ripple. Three other forcer configurations which achieve a three-phase, highly cost effective and high force density linear hybrid brushless servo motor are also disclosed.

27 Claims, 10 Drawing Sheets

LINEAR HYBRID BRUSHLESS SERVO MOTOR

BACKGROUND OF THE INVENTION

This invention relates generally to linear motor positioning and motion systems and methods, and more particularly to an improved linear hybrid brushless servo motor having high force density, high electrical power conversion ratio, and considerably low manufacturing cost.

Conventional linear brushless permanent magnet (PM) servo motors used in the prior art have either an 'iron-less design', comprising slot-less moving coil parts and a plurality of permanent magnets on stationary iron core plates (as described in U.S. Pat. No. 6,160,327), or an 'iron-core design' comprising a laminated iron core having slots and teeth and phase winding coils in the moving part and a plurality of permanent magnets on the stationary iron-core plate (as described in U.S. Pat. No. 5,642,013, U.S. Pat. No. 5,910,691 and U.S. Pat. No. 6,242,822). The iron-less design has the advantage of zero cogging, zero attractive force and very little mass in the moving part. This design can provide high velocities and high acceleration/deceleration(s) during dynamic motion, but the thrust force is substantially limited because of the big air-gap. The iron-less design also exhibits low force density and low power conversion ratio due to being slot-less and having a relatively big air-gap. Finally, this design is not cost effective due to the need for many high-cost, high energy product, rare-earth permanent magnets. The iron-core design, on the other hand, has high electromagnetic interaction and coupling between the high performance ferromagnetic laminated primary part with slots and winding coils and the high energy product permanent magnets on the stationary ferromagnetic plate so as to have high force density and power conversion ratio in the motor. It also allows the motor to generate high thrust force and provide high velocity and acceleration/deceleration during dynamic motion. It's high manufacturing cost as well as its use of many high-cost rare-earth permanent magnets, however, makes it inherently more expensive than motors using fewer or no magnets, such as stepper motors, induction motors and variable reluctance motors especially for applications necessitating long motion stroke. Moreover, the iron-core design generates high cogging forces due to interactions between the polarity transition portions of the permanent magnets and both the slots and motor end effects in the primary part. Some technologies (such as those disclosed in U.S. Pat. No. 5,642,013 and U.S. Pat. No. 5,910,691) try to minimize the parasitic cogging force in linear iron-core brushless motors. However, they do not eliminate the need to use magnet track plates comprising many high cost rare earth permanent magnets, which results in the high cost of manufacturing motors with such designs.

SUMMARY OF THE INVENTION

One object of the present invention is to provide a high performance linear brushless servo motor with high force density and high power conversion ratio with substantially lower manufacturing cost. The present invention yields high electromagnetic coupling and high thrust force with optimal coupling between the forcer and the platen by combining traditional high performance linear brushless PM motor technologies with cost effective linear stepper motor technologies. The present invention preferably uses low cost ferromagnetic steel plates instead of high cost magnet plates as the secondary platen so as to substantially reduce the total cost of manufacturing the motor. However, the forcer and platen can also be made with a laminated plate, which substantially improves the motor's dynamic performance. The motor has three phases offset ±120° and/or ±240° electrically from each other. Supplied by a source of three-phase sinusoidal voltage and current, the forcer interacts with the platen to facilitate operation as a linear three-phase brushless servo motor.

In one embodiment of the present invention, the forcer is designed with a mechanical coupling configuration between phase assemblies via two E-shaped stacks to reduce the total number of laminated stacks, eliminate the spaces between phase assemblies and thus substantially lower manufacturing costs. This mechanical coupling configuration also substantially minimizes the existing cogging force and force ripple. Each phase is comprised of a U-shaped stack and a portion of an E-shaped stack, a permanent magnet (preferably rare-earth) positioned between the U-shaped and E-shaped stacks, and a phase coil wound in the slots of each stack.

Each phase has four forcer teeth facing the corresponding teeth or slots of the platen such that any two alternate teeth of the forcer face the corresponding teeth of the platen substantially identically so as to make any such two alternate teeth operate with the platen in the same operational way. The body and tip of each tooth, the stack, the phase coil and the permanent magnet in each phase are designed and optimized to have optimal electromagnetic coupling between the forcer and the platen so as to substantially maximize the force density and power conversion ratio. The U-shaped and E-shaped laminated stacks have two and three teeth, respectively. Each tooth has a tooth body with either a single tooth or plurality of teeth at the tip thereof. The pole pitch of the forcer is substantially the same as that of the platen. The platen comprises a plurality of teeth and slots located alternatively to each other and directed transversely to the direction of movement, and a yoke (preferably iron core) having paths through which magnetic fluxes may pass. A stack may be shifted by an electrical angle, $\theta$, or a physical distance of $(\theta/360°)*\tau$, where $\tau$ is the pole pitch, in each phase assembly of the forcer to substantially minimize ripple of the total thrust force and the inherent cogging force as well. The electrical angle, $\theta$, is preferably in the range of $-45°$ to $+45°$.

In a second embodiment of the present invention, a forcer having a different configuration is used. In particular, the forcer has six U-shaped stacks, a permanent magnet positioned between adjacent U-shaped stacks, and a phase coil wound in the slots of the corresponding stacks to form three phase assemblies. In addition, two displacers are positioned between the three phase assemblies.

In a third embodiment of the present invention, a forcer having a different configuration is used. In particular, the forcer has two E-shaped stacks and two U-shaped stacks, and six permanent magnets positioned on top of the stacks. Three phase coils are wound in their corresponding stack slots to form three phase assemblies.

In a fourth embodiment of the present invention, a forcer having a different configuration is used. In particular, the forcer comprises six U-shaped stacks, six permanent magnets positioned on the top of the six corresponding U-shaped stacks, and three plates positioned on the top of the permanent magnets. Three phase coils are wound in their corresponding stack slots to form three phase assemblies.

BRIEF DESCRIPTION OF THE DRAWINGS

The subsequent text will clearly describe the present invention in every detail in conjunction with the accompanying drawings, in which.

DETAILED DESCRIPTION OF THE PREFERRED EMBODIMENTS OF THE INVENTION

The present invention provides an advanced three-phase linear servo brushless motor having high force density and high power conversion ratio with low manufacturing costs. Unlike conventional linear servo brushless PM motors, the motor of the present invention includes a forcer operating as the primary part and a platen acting as the secondary part. It combines high performance linear brushless PM motor technology and cost effective linear stepper motor technology to make a motor that has substantially high static and dynamic performance and considerably low manufacturing cost as well. It uses an advanced configuration so that a motor having high force density and high power conversion ratio with the optimal electromagnetic coupling can be achieved. While the motor of the present invention will be described in connection with linear positioning systems and linear motion systems for planar movement in a single direction, it can be appreciated that it can be used with positioning or motion systems having a plurality of axes to allow for planar movement in at least two orthogonal directions. With the support of the other components in the system, the motor of the present invention can be used as the essential mechanical element so that single-axis and multi-axis linear positioning systems and linear motion systems for linear movement with single and multi-axis directions can be achieved. It can be used in any industry or application requiring high-accuracy positioning and motion including, but not limited to, high-accuracy machining systems, production and assembly systems and equipment, process and fabrication equipment, and gantry systems used in the semiconductor industry, fiber-optical industry, and computer hard disk industry.

Figure 1:
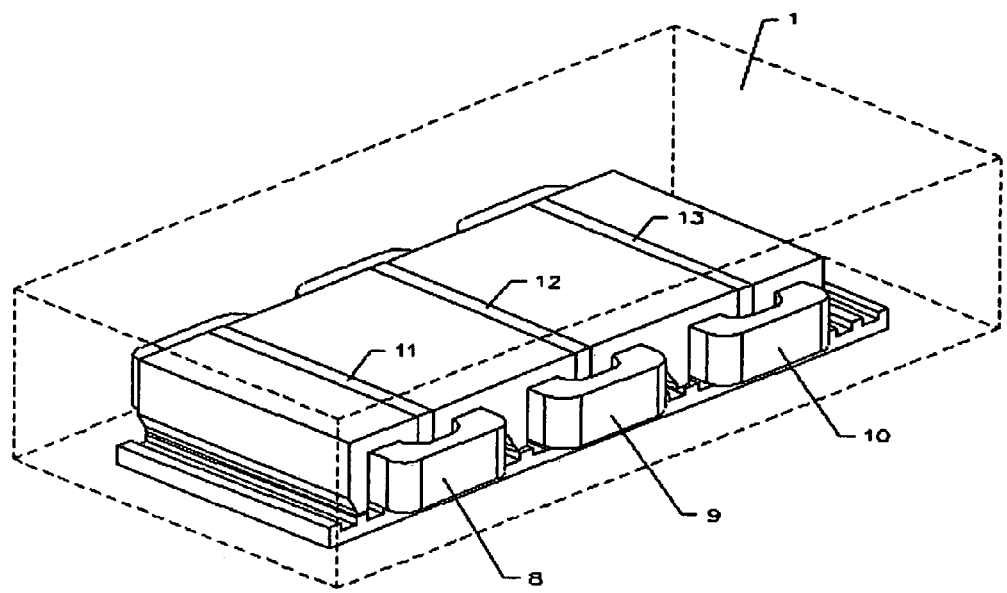
FIG. 1 is a perspective view with portions shown in phantom of a motor in accordance with one embodiment of the present invention.
Figure 2:
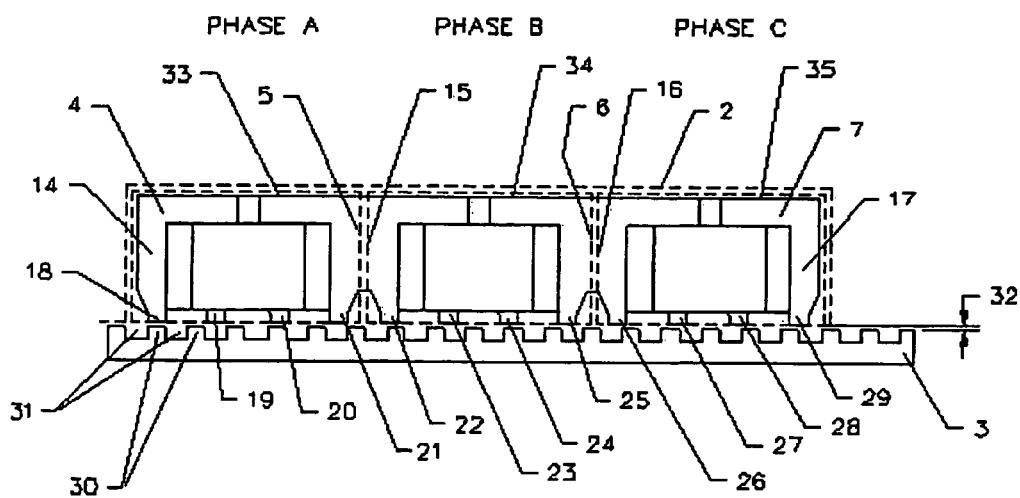
FIG. 2 is a front sectional view of the motor of FIG. 1.
Figure 17:
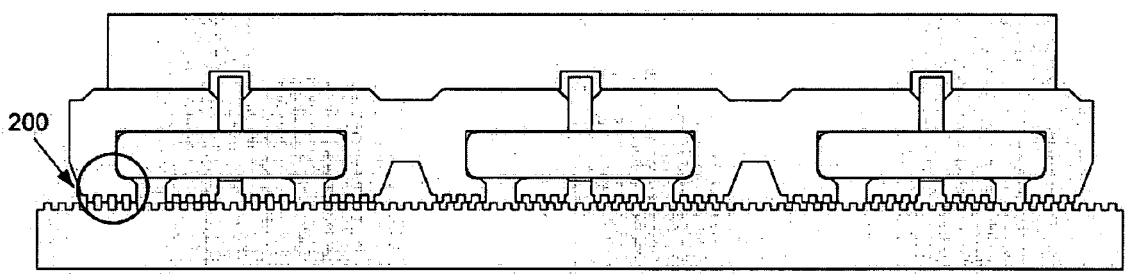
FIG. 17 is a front sectional view of the motor of FIG. 1 having a different tooth configuration.

In accordance with one embodiment of the present invention as shown in FIGS. 1 and 2, the motor 1 includes a forcer 2 and a platen 3. The forcer 2 comprises three phase assemblies, a first phase assembly 33 (phase A), a second phase assembly 34 (phase B) and a third phase assembly 35 (phase C). Each phase assembly comprises at least one entire stack and a portion of another stack, a permanent magnet positioned between the stacks, and a phase coil. The central phase assembly is coupled with the other two adjacent phase assemblies by E-shaped stacks 5, respectively. For example, the first phase assembly 33 comprises a U-shaped stack 4 and a half of an E-shaped stack 5. A permanent magnet 11 (preferably rare earth) is positioned between them. A phase coil 8 for phase A is wound in the corresponding slots of its magnetic stacks 4 and 5. The U-shaped stack 4 has two teeth, each tooth having a tooth body 14 with corresponding tooth tips 18 and 19. The E-shaped stack has three teeth, each tooth having a tooth body 15 with corresponding tooth tips 20, 21, 22, and 23. However, only the first entire tooth, and substantially half of an adjacent tooth of the E-shaped stack 5 belong to the first phase assembly 33. Therefore, the first phase assembly 33 comprises only tooth tips 18, 19, 20, and 21. A similar stack, tooth body and tooth tip design is used for the other two phase assemblies 34 and 35. In particular, the second phase assembly comprises the two halves of two E-shaped stacks 5 and 6. A permanent magnet 12 (preferably rare earth) is positioned between stacks 5 and 6. A phase coil 9 is wound in the corresponding slots of its two halves of the two E-shaped stacks 5 and 6. Four tooth bodies of the two E-shaped stacks 5 and 6 are used for the second phase, with corresponding four tooth tips 22, 23, 24 and 25. The third phase assembly 35 comprises one half of an E-shaped stack 6 and an entire U-shaped stack 7. A permanent magnet 13 (preferably rare earth) is positioned between the stack 6 and the stack 7. A phase coil 10 is wound in the corresponding slots of its stacks 6 and 7. Stacks 6 and 7 have a total of four tooth bodies 16 and 17 and four corresponding tooth tips 26, 27, 28 and 29. All of tooth tips 18-29 of the forcer 2 face the corresponding teeth 30 of the platen 3. While each embodiment of the invention will be described with each tooth body having a single tooth at the tooth tip, it can be appreciated that a tooth body with a plurality of teeth 200 at the tooth tip as shown in FIG. 17 may be used.

The second phase assembly 34 is physically coupled with the first phase assembly 33 and the third phase assembly 35 via E-shaped stack 5 and E-shaped stack 6, respectively. The stacks 4, 5 and 6 may be laminated or solid and are preferably made from a highly magnetic material which has high magnetic permeability. The U-shaped stacks can be made by cutting from the E-shaped stacks, substantially lowering manufacturing costs for the stacks.

The platen 3 comprises a plurality of alternating teeth 30 and slots 31 directed transverse to the direction of movement. The platen also has a yoke, preferably iron core, having paths through which the magnetic fluxes may pass. The motor 1 preferably includes a mechanical support system (not shown) preferably comprising linear bearings, air bearings or a similar structure to align and support the forcer 2 and ensure a consistent clearance or air-gap 32 between the forcer 2 and the platen 3 during operation. While the motor 1 will be described with the forcer 2 being movable and the platen 3 being stationary such that the forcer 2 moves linearly over the platen 3, it can be appreciated that the motor operation movement between the forcer 2 and the platen 3 is relative and that the platen 3 can operate as the movable part and the forcer 2 can act as the stationary part.

With respect to the forcer 2, the central axis of the first phase assembly 33, is offset electronically from the second phase assembly 34 by approximately $T*180°±120°$, the second phase assembly 34 is offset electronically from the third phase assembly 35 by approximately $T*180°±120°$ and the first phase assembly 33 is offset electronically from the third phase assembly 35 by approximately $T*180°±240°$, where T is an integer, making the motor 1 a three-phase servo motor. Without shifting any stack or tooth, the central axis of each alternating tooth tip (e.g. tooth tips 18 and 20, tooth tips 19 and 21, etc.) is offset by $T*360°$ electrically in each phase, making the central axes of all of the alternating tooth tips offset physically by a distance of $N*T$ where N is an integer and T is the pole or tooth pitch of the forcer. The central axes of adjacent tooth tips are offset by $T*180°$ electrically, making the central axes of all adjacent tooth tips offset physically by a distance of $(M+½)*T$ in each phase assembly, where M is an integer.

The pole pitch of the forcer 2 is substantially the same as that of the platen 3. The pole pitch is preferably equal to, or greater than 0.1 mm. However, any pole pitch may be used, including without limitation 0.1 mm, 0.2 mm, 0.5 mm, 1 mm, 2 mm, 5 mm, 8 mm, 10 mm, 12 mm, 15 mm, 20 mm, 25 mm, 50 mm, and 100 mm. The width of the tooth tips of the forcer 2 is preferably in the range of $(0.2~0.7)*T$. The shape and size of the tooth bodies 14 and 17 of the U-shaped stacks and the tooth bodies 15 and 16 of the E-shaped stacks are designed and optimized based on the size of the permanent magnets, 11, 12, and 13 and the phase coils 8, 9, and 10, to make the motor 1 have optimal performance and generate maximum thrust force during operation.

Figure 3:
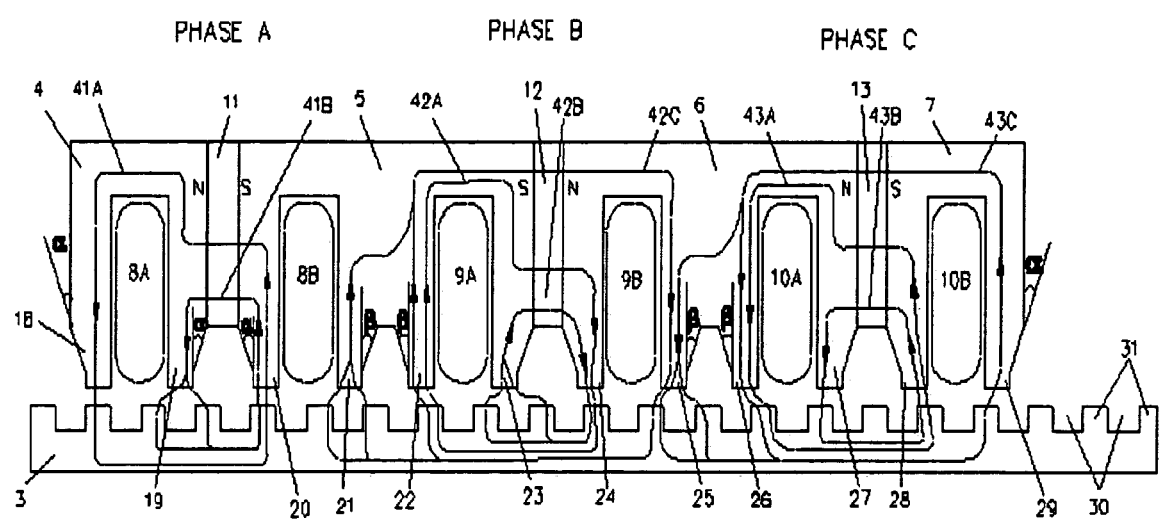
FIG. 3 is a front sectional view of the motor of FIG. 1 without a supply current in the three phase coils, and with the forcer located at an initial position, where the teeth of phase A are substantially aligned or unaligned with respect to the corresponding platen teeth, and further illustrating the magnetic flux loops in each phase at this position.

FIG. 3 shows a front sectional view of the motor 1 of FIG. 1 with the forcer 2 located at an initial movement position where the teeth of phase A (the first phase) are either substantially aligned or unaligned with the corresponding teeth of the platen 3. FIG. 3 also illustrates the magnetic flux loops in the first phase assembly 33 (Phase A), the second phase assembly 34 (Phase B) and the third phase assembly 35 (Phase C) without supply voltage/current. The polarity of the three permanent magnets for the three phases are arranged substantially opposite each other. For example, if the polarity of the permanent magnet for the first phase (Phase A) is arranged from north to south in a direction from left to right, the polarity of the permanent magnet for the adjacent second phase (Phase B) is arranged from south to north in a direction from left to right, and the polarity of the permanent magnet for third phase (Phase C) is arranged from north to south in a direction from left to right.

As shown in FIG. 3, in Phase A, without shifting, two alternate teeth of the forcer 2 substantially align with the corresponding teeth of the platen 3 and the two other teeth of the forcer 2 are substantially un-aligned with the corresponding teeth of the platen 3. As a result, any two alternate teeth of the forcer operate substantially identically and any two adjacent teeth of the forcer operate substantially in opposition. Phase A generates a main flux 41A and a flux leakage 41B. The main flux 41A starts from the north pole of its permanent magnet 11 and goes though the tooth body and its tooth tip 18 to the corresponding tooth and the yoke of the platen 3, comes back though tooth tip 20 and its tooth body to the south pole of the permanent magnet 11, and closes at the north pole of the permanent magnet 11. It is similar to the loop of flux leakage 41B. In Phase B and Phase C, all of the tooth tips and slots of the forcer partially align with the corresponding teeth and slots of the platen 3 with different electrical angles. Main fluxes 42A & 42C and flux leakage 42B are generated for Phase B, and main fluxes 43A & 43C and flux leakage 43B are generated for Phase C. Phase A and Phase B couple each other physically by the E-shaped stack 5 and Phase B and Phase C couple each other physically by the E-shaped stack 6, making some flux of the main flux 42C of Phase B pass through one of the tooth tips of Phase A, tooth tip 21, to two corresponding teeth of platen 3 and converge with the loop of the main flux 42C of phase B, and some flux of the main flux 43C of Phase C pass through one of the tooth tips of Phase B, tooth tip 25, to two corresponding teeth of platen 3 and converge with the loop of the main flux 43C of Phase C, respectively.

It can be seen from FIG. 3 that in any phase, the width of each tooth body is wider than its tooth tip to avoid high magnetic saturation in the tooth body and so as to minimize the magneto motive force (m.m.f.) drop across the tooth body and maximize the flux density in the air-gap between forcer 2 and platen 3. This in turn maximizes the thrust force generated by the motor system and optimizes the motor's characteristics. In the U-shaped stacks, the mechanical angle, $\alpha$, between a line connecting the tooth tip edge and tooth body edge is in the range of 0° to 90°. In the E-shaped stack, the valley between two teeth tips can be constructed in the form of a variety of shapes including but not limited to a trapezoid, a triangle, or a square. In the E-shaped stacks, the mechanical angle, $\beta$, between an edge of a tooth body and a line connecting the tooth tip edge and tooth body edge is also in the range of 0° to 90°. The angle, $\beta$, can be different from or substantially equal to angle, $\alpha$. If the two angles, $\alpha$ and $\beta$, are substantially equal, the U-shaped stacks can be easily made by simply cutting an E-shaped stack along its center axis symmetrically, thereby substantially lowering manufacturing cost for the stacks.

Figure 4:
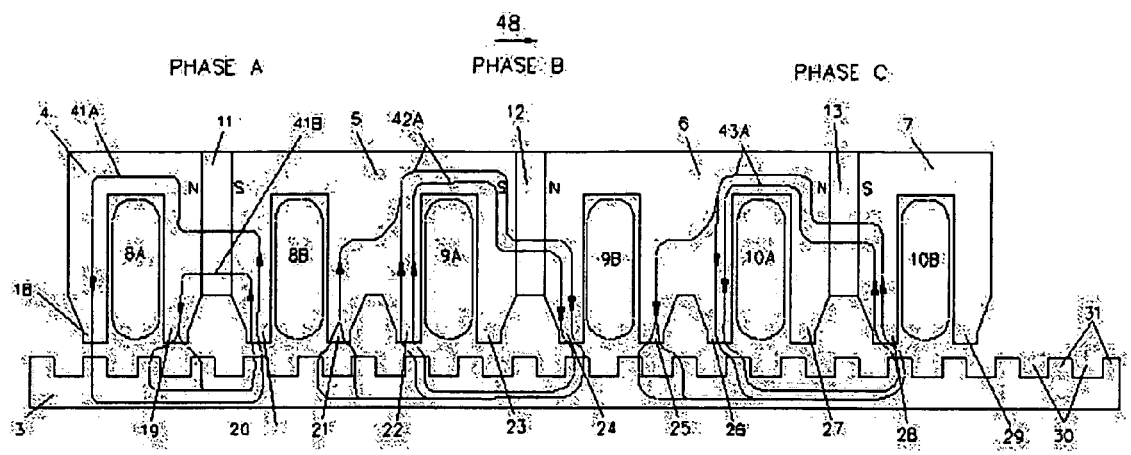
FIG. 4 is a front sectional view of the motor of FIG. 1 with a supply current in the three phase coils, and the forcer located at the initial position of FIG. 3, and further illustrating the magnetic flux loops in each phase at this position.
Figure 5:
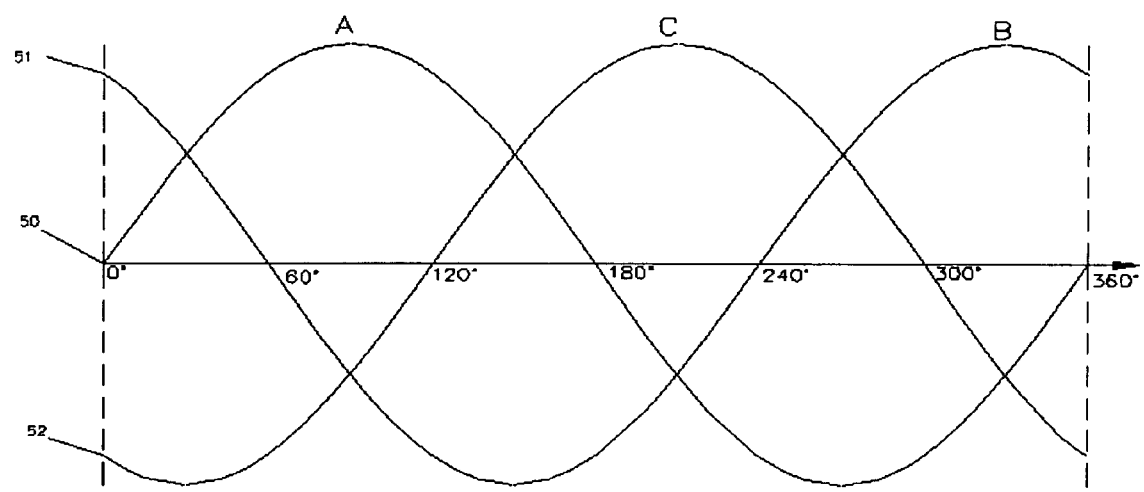
FIG. 5 is a diagram of the waveform and working point of the three-phase supply current at the initial position of FIG. 4.

FIG. 4 shows a front sectional view of the motor 1 of FIG. 1 with the forcer 2 located at the initial movement position with a supply voltage or current. The teeth of Phase A, the first phase, are either substantially aligned or un-aligned with the corresponding teeth of the platen 3. FIG. 5 shows the waveform and working points of the three-phase supply current at this position. In particular, the working points of the supply current for Phase A, Phase B, and Phase C are 50, 51 and 52, respectively. With respect to Phase A, the phase current is zero so that without shifting the stack or teeth in Phase A, substantially no thrust force is generated by Phase A of the motor 1, resulting in a flux loop as shown in FIG. 3. The phase currents of Phase B and Phase C, however, are not zero. Rather, they have substantially the same value, namely $0.5*\text{Sqrt}(3)*I_p$, where $I_p$ is the peak value of the sinusoidal waveform of the phase current. Without shifting the stack or tooth for either Phase B or Phase C, the central axis of all of the tooth tips of Phase B and Phase C shift from the corresponding teeth of platen 3 by electrical angles of 60° or 120°, respectively, at this position.

In a preferred embodiment, the phase assembly 34 for Phase B and its corresponding phase coil are designed and wound in a way so as to substantially enhance the main magnetic flux 42A and its corresponding electromagnetic field, as well as to minimize or eliminate the unexpected fluxes 42B and 42C and their corresponding electromagnetic field. Such a winding configuration optimizes magnet size and phase coil so as to maximize force density and performance of the motor. Such a configuration also minimizes the unexpected pulling force against the movement direction 48 so as to substantially enhance the total thrust force generated by Phase B. The phase assembly 35 for Phase C and its corresponding winding coil are also preferably designed and wound in a way so that the main magnetic flux 43A and its corresponding electromagnetic field are substantially enhanced and the unexpected fluxes 43B and 43C are substantially minimized. Such a configuration will likewise minimize the unexpected pulling force against the movement direction 48 so as to substantially enhance the total thrust force generated by Phase C. As a result, force density and motor performance are enhanced.

As shown in FIG. 4, due to the physical coupling between Phase A and Phase B by the E-shaped stack 5 and physical coupling between Phase B and Phase C by the E-shaped stack 6, some fluxes of the main fluxes 42A of Phase B pass through one of the tooth tips of Phase A, tooth tip 21, to two corresponding teeth of platen 3 and converge with the loop of the main fluxes 42A of Phase B, while some fluxes of the main fluxes 43A of Phase C go though one of the tooth tips of Phase B, tooth tip 25, to two corresponding teeth of platen 3 and converge with the loop of the main fluxes 43A of Phase C, respectively. As a result of such coupling, the unexpected cogging force and ripple of the thrust force with three-phase sinusoidal supply current input to the motor is substantially minimized.

Figure 6:
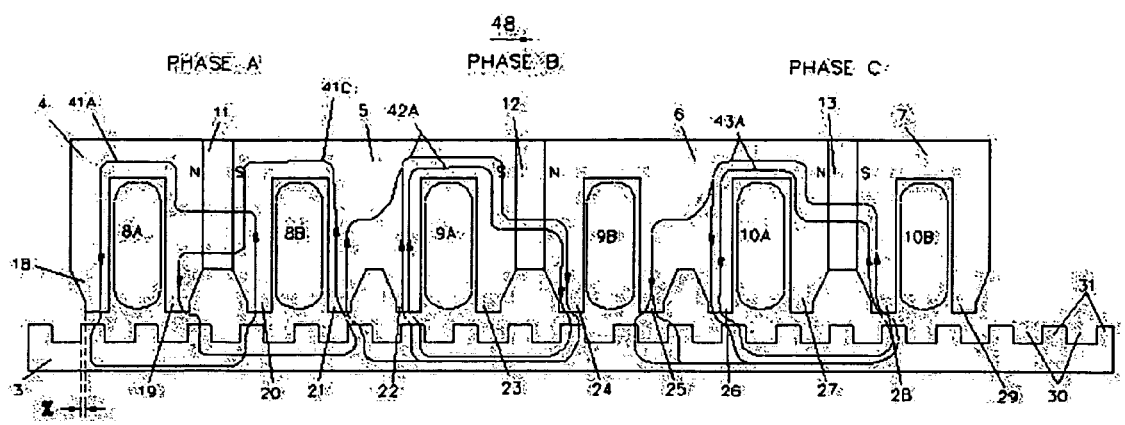
FIG. 6 is a front sectional view of the motor of FIG. 1 with a supply current in the three phase coils and the forcer located at a movement position, where the forcer has moved forward approximately $\chi$ from the initial position of FIG. 4, and further illustrating the magnetic flux loops in each phase at this position.
Figure 7:
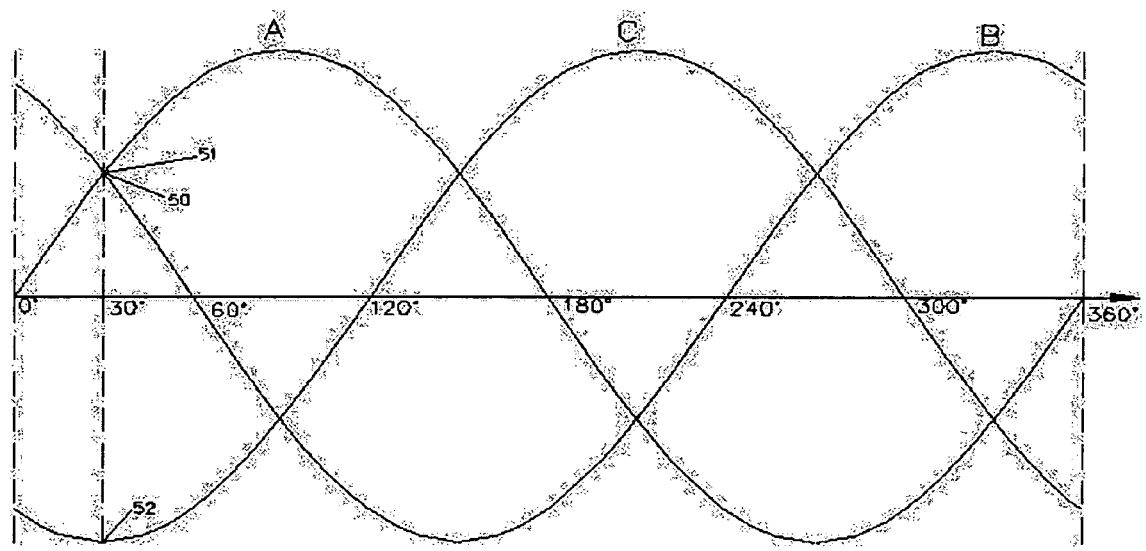
FIG. 7 is a diagram of the waveform and working point of the three-phase supply current at the movement position of FIG. 6.

During the operation and movement of the motor 1, all of the teeth of the three phases in the forcer 2 partially align with the corresponding teeth or slots of the platen 3 during most operational moments. FIG. 6 shows the motor forcer 2 moving forward along the movement direction at a random position with a physical distance of $\chi$ from the initial position wherein all three phases have phase current input. The relative electrical angle is approximately $\gamma=360°*(\chi/\tau)$. The magnetic flux loops in each phase with supply current at this position are also illustrated in FIG. 6. FIG. 7 illustrates the waveform, working point and value of the three-phase supply current at this position. Phase A, Phase B, and Phase C have the working points 50', 51', and 52', respectively. In each phase, the corresponding permanent magnet and winding coil are designed to have optimal electromagnetic coupling so that the expected main electromagnetic field and the related main fluxes will be substantially enhanced and the unexpected electromagnetic field and related leakage fluxes will be substantially minimized. For example, in Phase A, an optimal design in forcer 2 will substantially enhance the expected electromagnetic field and the main flux 41C and minimize the unexpected leakage flux 41A and the related electromagnetic field so as to minimize the unexpected pulling force against the movement direction 48. Likewise, the expected main fluxes 42A of Phase B and 43A of Phase C and their corresponding electromagnetic fields are substantially increased. FIG. 7 also shows the moment when the forcer 2 moves forward with a movement direction from the initial position by an electrical angle, $\gamma$, of approximately $\gamma=30°$, or a physical distance of $\chi=(\tau*\gamma)/360°$. At this position, the current values of Phase A, B, and C are $0.5*\text{Sqrt}(2)*I_p$, $0.5*\text{Sqrt}(2)*I_p$, and $I_p$, respectively, where $I_p$ is the peak value of the sinusoidal waveform of the phase current.

Similarly, FIG. 6 shows that due to the physical coupling between Phase A and Phase B by E-shaped stack 5 and the physical coupling between Phase B and Phase C by E-shaped stack 6, some fluxes of the main fluxes 42A of Phase B go though one of the tooth tips of Phase A, tooth tip 21, to two corresponding teeth of platen 3 and converge with the loop of the main flux 42A of Phase B, and some fluxes of the main fluxes 43A of Phase C go though one of the tooth tips of Phase B, tooth tip 25, to two corresponding teeth of platen 3 and converge with the loop of the main fluxes 43A of Phase C, respectively. This coupling substantially minimizes the unexpected cogging force and ripple of the thrust force with three-phase sinusoidal supply current input into the motor.

Figure 8:
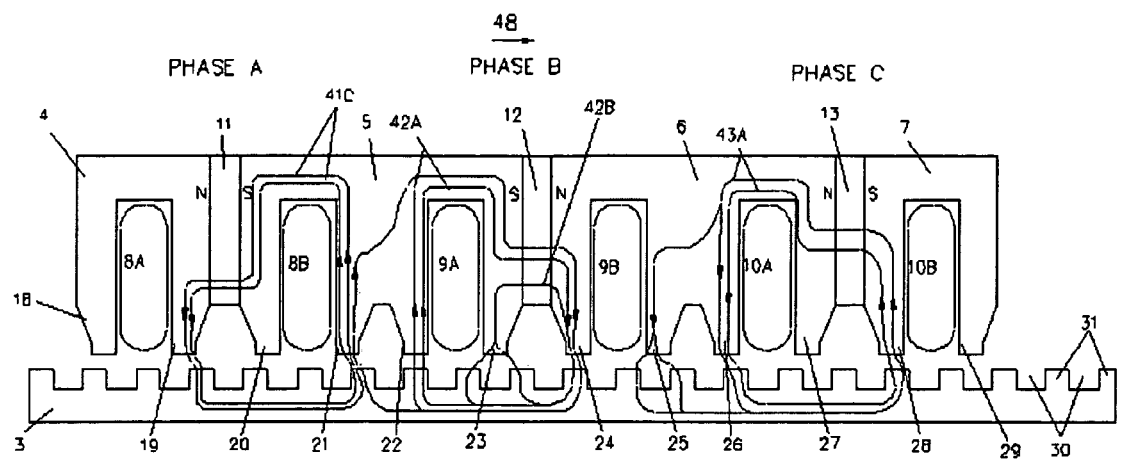
FIG. 8 is a front sectional view of the motor of FIG. 1 with a supply current in three phase coils and the forcer located at a movement position, where the teeth of the second phase assembly (Phase B) are either substantially aligned or unaligned with respect to the corresponding platen teeth, and further illustrating the magnetic flux loops in each phase at this position.
Figure 9:
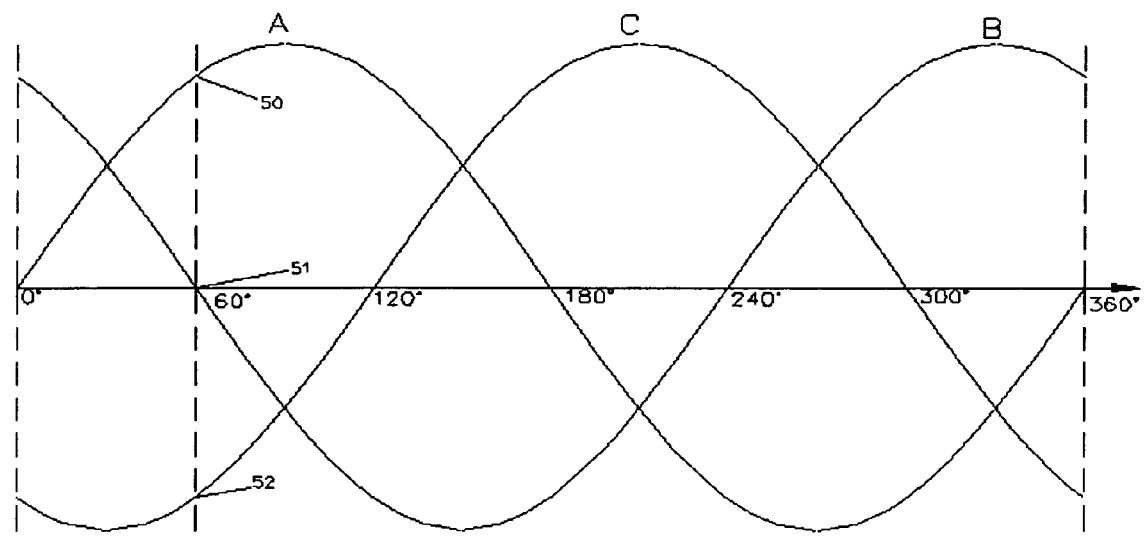
FIG. 9 is a diagram of the waveform and working point of the three-phase supply current at the movement position of FIG. 8.

FIG. 8 shows a front sectional view of the motor 1 of FIG. 1 when the forcer 2 is located at a movement position, where all of the teeth of the second phase assembly 34 (Phase B) are substantially aligned or un-aligned with the corresponding teeth of platen 3. At this position, the forcer 2 moves forward physically a distance of $\chi=[\tau*(60°/360°)]$ from the initial position. The value of the phase current of Phase A is substantially equal to that of Phase C, which is $0.5*\text{Sqrt}(3)*I_p$, where $I_p$ is the peak value of the sinusoidal waveform of the phase current. The phase current of Phase B is zero at this position. The magnetic flux loops of Phase A, Phase B, and Phase C at this position are illustrated in FIG. 8, respectively. As described above, an optimal design in forcer 2 will substantially enhance the expected main fluxes 41C and highly minimize the unexpected leakage fluxes 41A and 41B in Phase A. As a result, there are only main fluxes 41C and their corresponding electromagnetic field in Phase A at this position, which makes Phase A generate thrust force in the motion direction 48. Similarly with respect to Phase C, there are only main fluxes 43A and their corresponding electromagnetic field in Phase C at this position, which makes Phase C generate thrust force in the motion direction 48. FIG. 9 shows the phase current waveform and the related working points 50'''', 51'''' and 52'''' for Phase A, Phase B, and Phase C, respectively.

Figure 10:
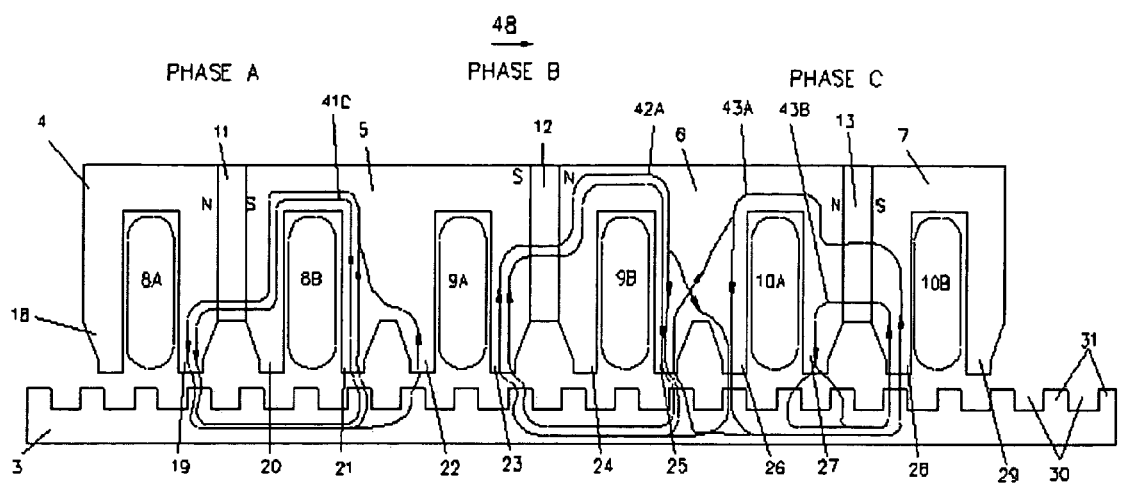
FIG. 10 is a front sectional view of the motor of FIG. 1 with the forcer located at a movement position, where the teeth of the third phase assembly (Phase C) are substantially aligned or unaligned with respect to the relative platen teeth, and illustrating the magnetic flux loops in each phase at this position.
Figure 11:
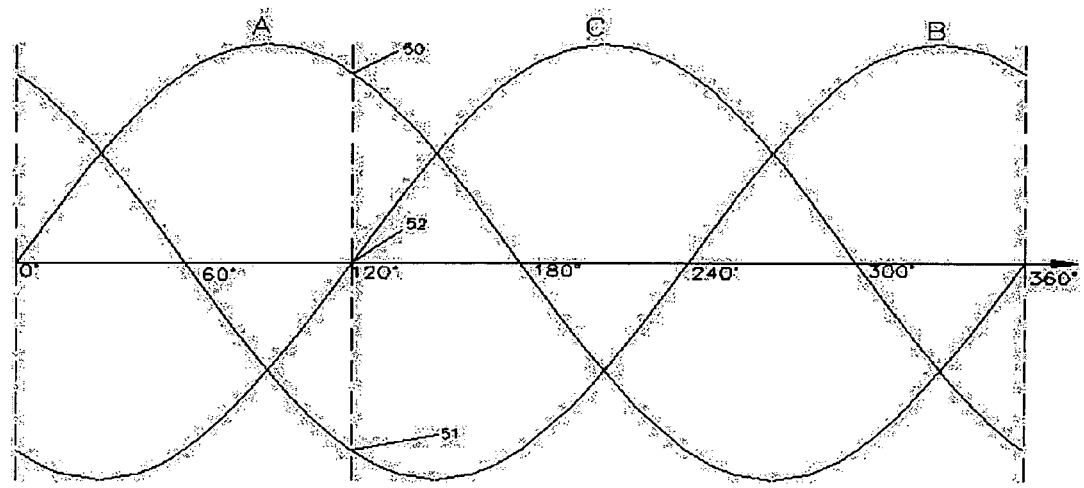
FIG. 11 is a diagram of the waveform and working point of the three-phase supply current at the movement position of FIG. 10.

Referring to FIG. 10, when the forcer 2 moves forward physically a distance of $\tau*(120/360)$ from the initial position, all the teeth of the third phase assembly 35 (Phase C) are substantially aligned or un-aligned with the corresponding teeth of platen 3. At this position, the phase current of Phase C is zero, and the phase current of Phase A is equal to that of Phase B, which is 0.5*Sqrt(3)*$I_p$. Phase A and Phase B generate thrust force while phase C generates no thrust force at this position. FIG. 10 also illustrates the magnetic flux loops of Phase A, Phase B, and Phase C at this position, respectively. An optimal design in forcer 2 substantially enhances the expected main fluxes 41C and highly minimizes the unexpected flux 41A and leakage 41B in Phase A. There are only main fluxes 41C and the corresponding electromagnetic field in Phase A at this position, which makes Phase A generate thrust force in the motion direction 48. Similarly, there are only main fluxes 42A and the corresponding electromagnetic field in Phase B at this moment. FIG. 11 shows the phase current waveform and the related working points 50"", 51"" and 52"" for Phase A, Phase B, and Phase C, respectively.

Figure 12:
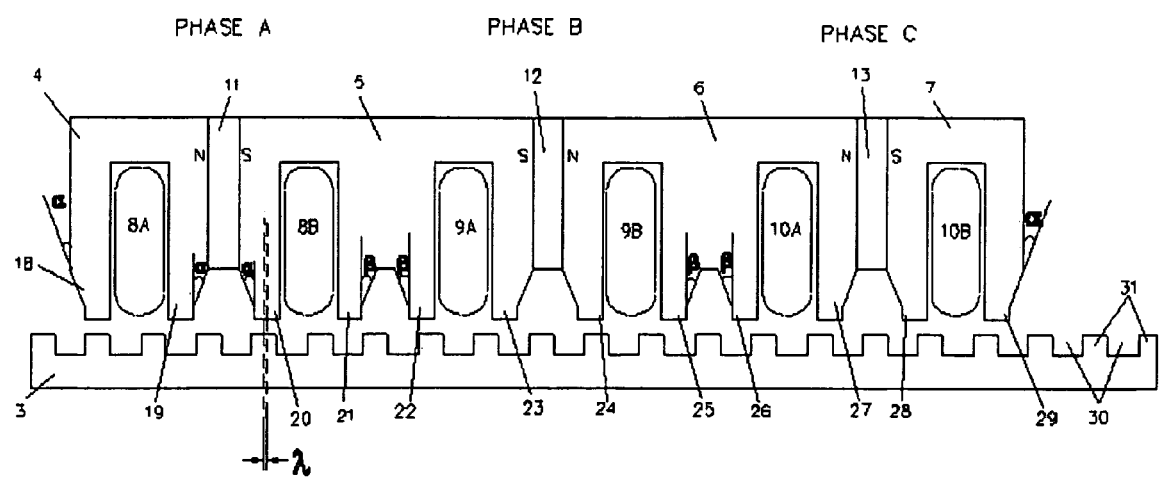
FIG. 12 is a front sectional view of the motor of FIG. 1 with the forcer having a stack offset from another stack.

FIG. 12 shows the motor of FIG. 1 with the motor forcer 2 having a stack or a tooth pair being offset by an electrical angle, θ, or a physical distance of λ=(θ/360°)*τ, in each phase. Shifting a stack or tooth pair with some electrical angle substantially reduces the unexpected cogging force and force ripple of the motor 1. The electrical angle, θ, varies in the range of −45° to +45°. By shifting the stack or tooth pair in each phase by some electrical angle, each phase assembly is designed to make forcer 2 have optimal electromagnetic coupling with platen 3 and to avoid any unexpected impact on motor 1 characteristic due to the shifting. Such a configuration also makes the motor system generate thrust force in the motion direction 48 with minimized cogging force and force ripple.

Figure 13:
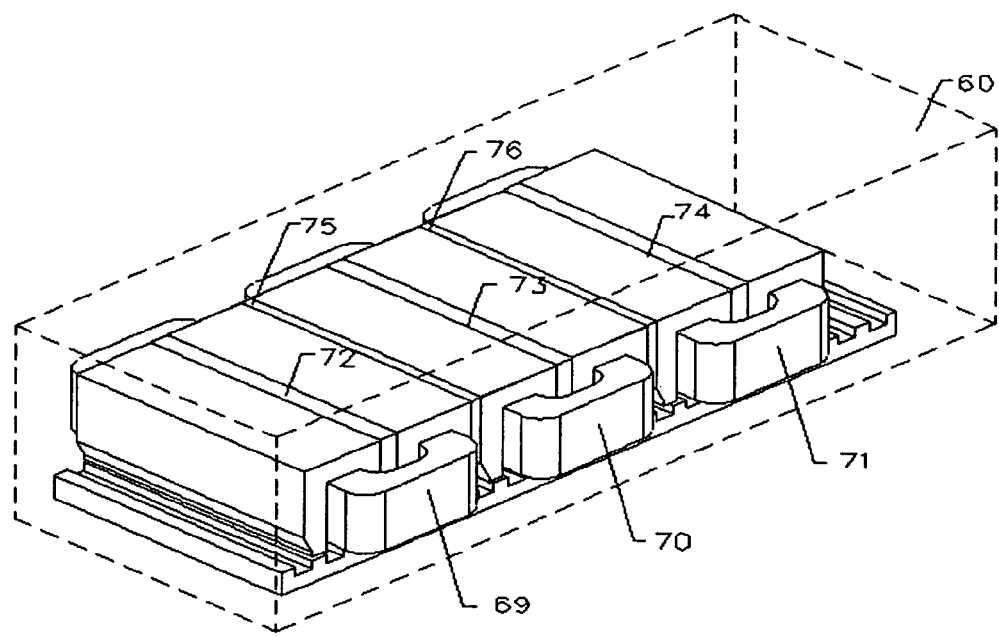
FIG. 13 is a perspective view with portions shown in phantom of a motor with a forcer in accordance with a second embodiment of the present invention.

FIG. 13 shows a motor 60 in accordance with a second embodiment of the present invention. The forcer 61 has six U-shaped stacks instead of the two E-shaped stacks and two U-shaped stacks according to the first embodiment of the present invention. Each phase assembly comprises two U-shaped stacks (preferably ferromagnetic), a permanent magnet (preferably rare-earth) positioned between adjacent U-shaped stacks, and a phase coil wound in the two slots of the corresponding stacks. In addition, two displacers 75 and 76 are positioned between the three phase assemblies, 83, 84, and 85, having a thickness to offset the central axis of the phase coil 70 of the second phase assembly 84 from the central axis of the phase coil 69 of the first phase assembly 83 by an electrical angle of approximately (T*180°±120°), or a physical distance of [(N+/−1/3)*τ], and to offset the central axis of the phase coil 71 of the third phase assembly 85 from the central axis of the phase coil 69 of the first phase assembly 83 by an electrical angle of approximately (T*180°±240°) wherein T is an integer, or a physical distance of [(N+/−2/3)*τ], wherein τ is the pole pitch of the forcer or the platen, so as to form a three phase motor. The platen 62 has a plurality of alternating teeth 99 and slots 98 directed transversely to the direction of movement, and an iron core yoke having a path through which the magnetic fluxes may pass. Motor 60 preferably includes a mechanical support system (not shown) preferably comprising linear bearings, air bearings or a similar structure to align and support the forcer 61 and ensure a consistent clearance or air-gap 100 between the forcer 61 and the platen 62 during movement.

Figure 14:
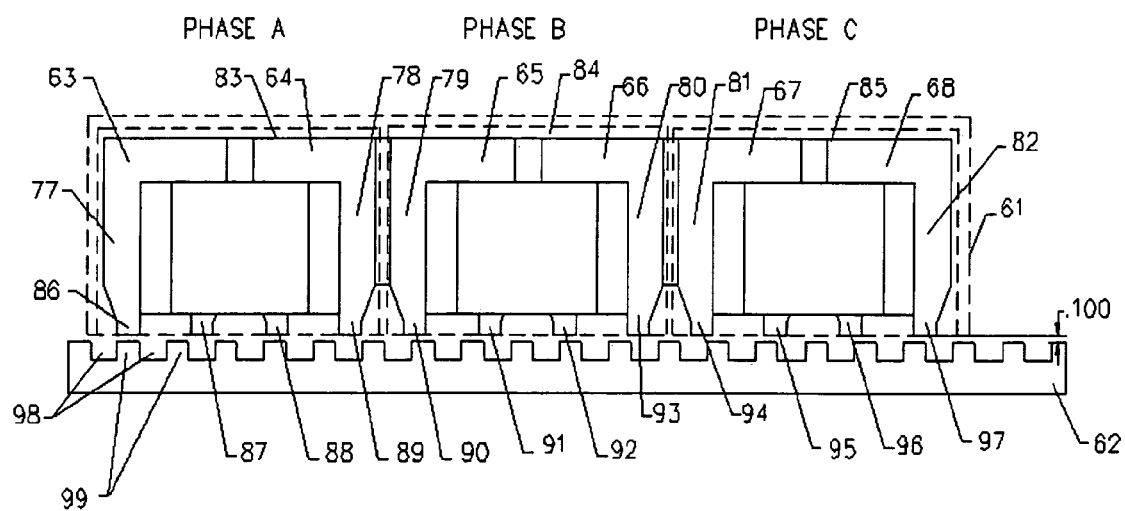
FIG. 14 is a front sectional view of the motor of FIG. 13.

As shown in FIG. 14, each U-shaped stack is constructed with two tooth bodies and a slot. The distance between the center axes of the tips of the two tooth bodies is approximately (M+1/2)*τ, where M is an integer and, τ is the tooth pitch. In each phase assembly, without shifting any stack and/or tooth in the stack, the distance between the center axes of all alternating tooth tips is approximately [N*τ], where N is an integer. This configuration initially makes the operational behavior and electrical position of the alternate teeth of each phase to be the same during operation of the motor. For example, in the first phase assembly 83, when the first tooth tip 86 substantially aligns with the corresponding tooth body of the platen, its alternate tooth tip (tooth tip 88) also substantially aligns with the corresponding tooth body of the platen such that the operational behavior and electrical position of such teeth bodies are substantially the same during motor operation.

The tooth body of each U-shaped stack is designed preferably wider than its corresponding tooth tip, so as to avoid high magnetic saturation in the tooth body and substantially minimize the flux density and the corresponding m.m.f. drop in the tooth bodies of each phase assembly and to substantially maximize flux density in the air-gap 100. This in turn maximizes the thrust force generated by each phase and optimizes motor characteristics. For example, in the first phase assembly 83, the two tooth bodies of the two U-shaped stacks, 63 and 64, are designed wider than their relative tooth tips, 86, 87, 88, and 89. The ratio of the tooth body to the tooth tip is preferably in the range of 1 to 3.

Similarly, the forcer 61 and the platen 62 have substantially the same pole pitch, preferably being greater than or equal to 0.1 mm. Their tooth tip width, $b_z$, is preferably in the range of (0.2-0.7)*τ, where τ is the pole pitch of the forcer 61 and the platen 62. The widths of the tooth tips 86-97 of the forcer 61 and the widths of the platen teeth 99 may be identical or different, but they should be designed such that the forcer 61 has high electromagnetic coupling with the platen 62 during motor operation, so that the total thrust force will be substantially increased. A method of shifting a stack or a tooth pair by an optimal electrical angle in each phase assembly can also be adopted to substantially minimize the inherent cogging force and the force ripple generated by the motor. The electrical angle is preferably in the range of −45° to +45°. With such a configuration, the central axes of all of the alternating tooth tips will be located at a physical distance of (N−θ/360)*τ in each phase assembly. A motor system with this configuration also allows for planar movement in at least two orthogonal directions.

Figure 15:
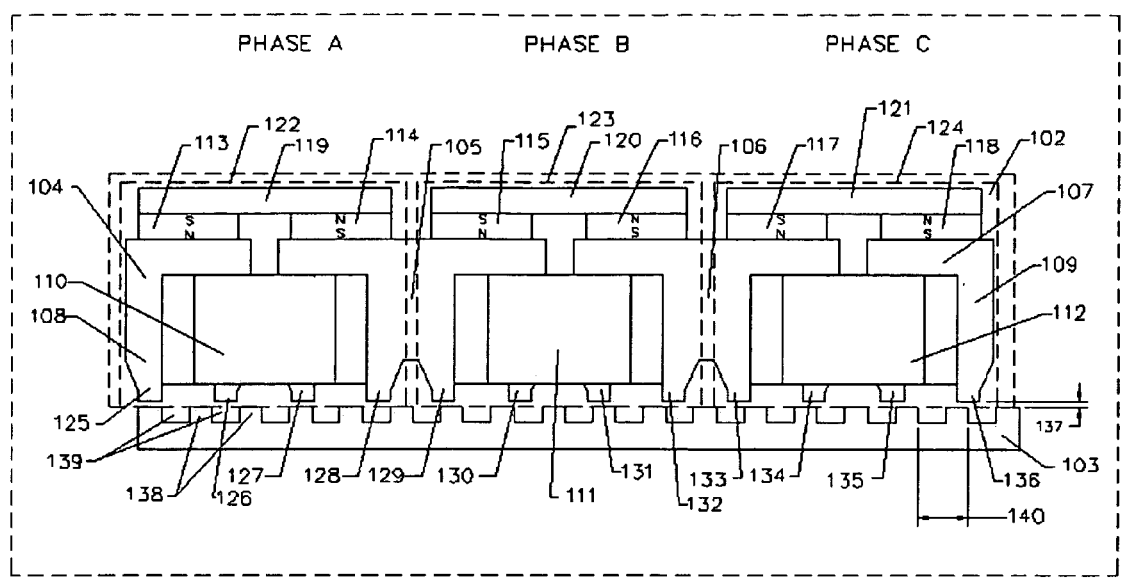
FIG. 15 is a front sectional view of a motor in accordance with a third embodiment of the present invention.

FIG. 15 shows a front sectional view of a motor with the forcer 102 having a configuration in accordance with a third embodiment of the present invention. The forcer 102 has two E-shaped stacks 105-106 and two U-shaped stacks 104, 107. However, six permanent magnets 113-118 (preferably rare earth) are positioned on the top of their corresponding stacks 104-107 (instead of between adjacent stacks according to the first embodiment of the present invention). Three steel plates 119-121 are positioned on the top of their corresponding permanent magnets 113-118 to form a back flux path in every phase assembly of the three phase assemblies 122, 123 and 124. As with the other embodiments, three phase coils 110-112 are wound in their corresponding stack slots.

The platen 103 comprises a plurality of alternating tooth bodies 138 and slots 139 directed transversely to the direction of movement, and an iron core yoke having a path through which the magnetic flux may pass. A mechanical support system (not shown) preferably comprising linear bearings, air bearings, or a similar structure is also preferably used to align and support the forcer 102 and ensure a consistent air-gap 137 between the forcer 102 and the platen 103.

The three phase coils 110-112 are wound to offset the central axis of the phase coil 111 of the second phase assembly 123 from the central axis of the phase coil 110 of the first phase assembly 122 by an electrical angle of approximately (T*180°±120°), or by a physical distance of [(N+/−1/3)*τ] where T is an integer and τ is the pole pitch of the forcer. The central axis of the phase coil 112 of the third phase assembly 124 is offset from the central axis of the phase coil 110 of the first phase assembly 122 by an electrical angle of approximately (T*180°±240°) or by a physical distance of [(N+/−2/3)*τ]. As a result, a three phase motor system is formed. In addition, all of the tooth bodies 104-107 of the stacks are preferably wider than their corresponding tooth tips 125-136. Such a configuration avoids high magnetic saturation in the tooth body and substantially minimizes the flux density and m.m.f. drop in the tooth bodies of the forcer 102 and highly enhances the air-gap flux density and corresponding electromagnetic field generated by the forcer so as to substantially increase the thrust force. The ratio of the tooth body to tooth tip is preferably in the range of 1 to 3.

The relative pole pitch, τ, of the forcer 102 and the platen 103 is substantially identical, and preferably 0.1 mm or greater. The width of the tooth tip of the forcer is preferably in the range of 0.2-0.7*τ. The tooth tip width of the forcer 102 and tooth tip width of the platen 103 can be the same or different, but is preferably designed to make the motor system substantially generate the thrust force in the motion direction. Similar to the first embodiment, a method of shifting a stack or a tooth body pair with an optimal electrical angle in each phase assembly also can be used to substantially minimize the existing cogging force and the force ripple generated by the motor system. The electrical angle is preferably in the range of −45° to +45°. The forcer 102 with shifted stack or tooth body pair at some electrical angle causes the central axes of all the alternate tooth tips to be located at a physical distance of (N−θ/360)*τ in each phase assembly. A motor with this configuration also allows for planar movement in at least two orthogonal directions.

Figure 16:
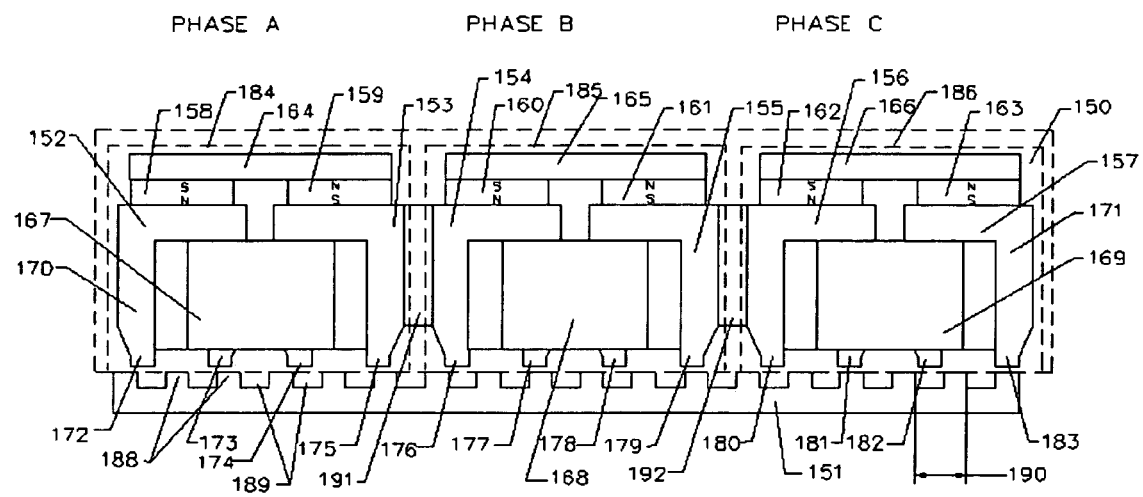
FIG. 16 is a front sectional view of a motor in accordance with a fourth embodiment of the present invention.

FIG. 16 illustrates a motor with a forcer having a configuration in accordance with a fourth embodiment of the present invention. The forcer 150 comprises six U-shaped stacks 152-157 (preferably ferromagnetic), six permanent magnets 158-163 (preferably rare earth) positioned on the top of the corresponding U-shaped stacks 152-157, respectively, and three ferromagnetic plates 164-166 positioned on the top of corresponding permanent magnets 158-163, respectively. Three phase coils 167-169 are wound in their corresponding stack slots to form three phase assemblies 184-186. Two displacers 191-192 may be positioned between the phase assemblies 184-186 with the appropriate thickness to correct offset electrical angles between phase assemblies 184-186. The central axis of the phase coil 168 of the second phase assembly 185 is offset from the central axis of the phase coil 167 of the first phase assembly 184 by an electrical angle of approximately (T*180°±120°) or by a physical distance of [(N+/−1/3)*τ], and the central axis of the phase coil 169 of the third phase assembly 186 is offset from the central axis of the phase coil 167 of the first phase assembly 184 by an electrical angle of (T*180°±240°) or a physical distance of [(N+/−2/3)*τ], where, T is an integer and τ is the pole pitch of the motor, so as to form a three phase motor system. The platen 151 has a plurality of alternating teeth 188 and slots 189 directed transversely to the direction of movement, and a yoke (preferably iron core) having a path through which the magnetic fluxes may pass. The motor preferably includes a mechanical support system (not shown) preferably comprising linear bearings, air bearings or a similar structure to align and support the forcer 150 and ensure a consistent air-gap between the forcer 150 and the platen 151. A motor with this configuration also allows for planar movement in at least two orthogonal directions.

All of the tooth bodies of stacks 152-157 are preferably made wider than their corresponding tooth tips 172-183, so as to avoid high magnetic saturation in the tooth body and substantially minimize the m.m.f. drop in the tooth bodies of the forcer 150 and highly enhance the air-gap flux density and the corresponding electromagnetic field generated by the forcer 150, thereby increasing the thrust force. The relative pole pitch, τ, of the forcer 150 and the platen 151 is substantially identical, and is preferably 0.1 mm or greater. The width of the tooth tip of the forcer 150 is preferably in the range of 0.2-0.7*τ. The tooth tip width of the forcer 150 and tooth tip width of the platen 151 can be the same or different, but it is preferably designed to make the motor system substantially generate the thrust force in the motion direction. A method of shifting a stack or a tooth pair with an optimal electrical angle in each phase assembly also may be used to substantially minimize the existing cogging force and the force ripple generated by the motor. The electrical angle is preferably in the range of −45° to +45°. The forcer 150 with a shifted stack or tooth body pair by some electrical angle makes the central axes of all of the alternate tooth tips located at a physical distance of (N−θ/360)*τ in each phase assembly. A motor with this configuration also allows for planar movement in at least two orthogonal directions.

While the motor of the present invention has been described in connection with a configuration in which all of the teeth of the forcer have tooth bodies with a single tooth at the tooth tip, it can be appreciated by one skilled in the art that a configuration in which each tooth body has a plurality of teeth at the tooth tip can be used (see teeth 200 in FIG. 17). In such a configuration, the distance between the center axis of any tooth and the center axis of an adjacent tooth is preferably substantially identical. This distance, which represents the tooth pitch or the relative pole pitch of the forcer, is preferably substantially identical to that of the platen. In one embodiment, this distance is preferably 0.1 mm or greater to ensure proper operation of the motor. Similarly, the width of each tooth of the forcer is preferably in the range of 0.2-0.7*τ. The tooth tip width of the forcer and tooth width of the corresponding platen can be the same or different, but is preferably designed to make the motor generate substantial thrust force in the motion direction.

The motor, which has just been described above, constitutes an appreciable technological advance in the field of linear brushless servo motors. Accordingly, it is intended that the scope of the invention not be limited by the disclosure of the preferred embodiments, but instead be determined entirely by reference to the claims that follow.

What is claimed is:

1. A linear hybrid brushless servo motor, comprising:
a forcer having a plurality of stacks with stack slots, the stacks comprising two U-shaped stacks positioned at each end of the forcer, and two E-shaped stacks positioned between the two U-shaped stacks, a magnet positioned between each stack, and three phase coils wound in the stack slots to form three corresponding phase assemblies; and,
a platen having a plurality of alternating teeth and slots directed transversely to a direction of movement, and a yoke having a path through which magnetic fluxes may pass.

2. The linear hybrid brushless servo motor of claim 1, wherein each E-shaped stack has three teeth and two stack slots, each tooth having a tooth body and a corresponding tooth tip, and wherein each U-shaped stack has two teeth, each tooth having a tooth body and a corresponding tooth tip, and one stack slot.

3. The linear hybrid brushless servo motor of claim 2, wherein the tooth body is wider than the tooth tip.

4. The linear hybrid brushless servo motor of claim 2, wherein the forcer has a pole pitch, T, wherein each tooth has a tooth width and each tooth tip has a center axis, and wherein the distance between the center axes of adjacent tooth tips in each phase assembly is approximately (M+1/2)*T, wherein M is an integer.

5. The linear hybrid brushless servo motor of claim 2, wherein the forcer has a pole pitch, T, and wherein distance between the center axis of each alternate tooth tip in each phase assembly is approximately [N*T], wherein N is an integer.

6. The linear hybrid brushless servo motor of claim 1, wherein the phase assemblies comprise a first phase assembly, a second phase assembly and a third phase assembly, and wherein the first phase assembly is offset electrically from the second phase assembly by approximately T*180°±120°, the second phase assembly is offset electrically from the third phase assembly by approximately T*180°±120°, and wherein the first phase assembly is offset electrically from the third phase assembly by approximately T*180°±240°, wherein T is an integer.

7. The linear hybrid brushless servo motor of claim 4, wherein the three phase coils comprise a first phase coil, a second phase coil and a third phase coil, each having a center axis, and wherein the distance between the center axes of the first phase coil and the second phase coil is approximately (N±1/3)T and the distance between the center axes of the first phase coil and third phase coil is approximately (N±2/3)T, wherein N is an integer.

8. The linear hybrid brushless servo motor of claim 2, wherein each tooth tip of the U-shaped stacks has a tip edge and each tooth body of the U-shaped stacks has a body edge, wherein the body edge and a line connecting the tip edge and the body edge define a U-shaped angle therebetween, and wherein each tooth tip of the E-shaped stacks has a tip edge and each tooth body of the E-shaped stacks has a body edge wherein the body edge and a line connecting the tip edge and the body edge define an E-shaped angle therebetween.

9. The linear hybrid brushless servo motor of claim 8, wherein the U-shaped angle ranges between 0° to 90°.

10. The linear hybrid brushless servo motor of claim 9, wherein the E-shaped angle ranges between 0° and 90°.

11. The linear hybrid brushless servo motor of claim 8, wherein the U-shaped angle and the E-shaped angle are substantially identical.

12. The linear hybrid brushless servo motor of claim 1, wherein the forcer comprises at least one of a low-carbon high-magnetic laminated material or a low-carbon high-magnetic sintered iron material, and wherein the platen comprises a low-carbon ferromagnetic material.

13. The linear hybrid brushless servo motor of claim 2, further comprising a support positioned between the forcer and the platen which defines a physical clearance therebetween.

14. The linear hybrid brushless servo motor of claim 13, wherein the support comprises at least one of linear mechanical bearings or air bearings.

15. The linear hybrid brushless servo motor of claim 2, wherein the forcer is movable and the platen is stationery.

16. The linear hybrid brushless servo motor of claim 2, wherein movement between the forcer and the platen is relative.

17. The linear hybrid brushless servo motor of claim 6, wherein the first phase assembly is physically coupled to the second phase assembly and the second phase assembly is physically coupled to the third phase assembly.

18. The linear hybrid brushless servo motor of claim 13, wherein the platen comprises a yoke, and wherein each magnet is adapted to generate an electromagnetic field and corresponding magnetic fluxes, and wherein the magnetic fluxes pass through the clearance between the first tooth of the forcer to be substantially aligned with a corresponding tooth of the platen, to the yoke of the platen, to the next adjacent tooth of the platen, to the corresponding substantially aligned tooth of the forcer, and then through the magnet.

19. The linear hybrid brushless servo motor of claim 18, wherein the magnetic fluxes through each phase assembly interact with the platen to produce a thrust force in the direction of movement.

20. The linear hybrid brushless servo motor of claim 2, wherein the forcer has a forcer pole pitch, T, and the platen has a platen pole pitch, T, and wherein the forcer pole pitch and the platen pole pitch are substantially identical and at least 0.1 mm.

21. The linear hybrid brushless servo motor of claim 2, wherein the forcer has a pole pitch, T, and wherein the tooth tip has a width, $b_z$, in the range of 0.2 to 0.7T.

22. The linear hybrid brushless servo motor of claim 1, wherein each stack comprises a plurality of teeth.

23. The linear hybrid brushless servo motor of claim 22, wherein each tooth comprises a tooth body and a tooth tip, the tooth body having a single tooth at the tooth tip.

24. The linear hybrid brushless servo motor of claim 22, wherein each tooth comprises a tooth body and a tooth tip, the tooth body having a plurality of teeth at the tooth tip.

25. The linear hybrid brushless servo motor of claim 20, wherein a stack in each phase assembly is shifted by at least one of an electrical angle, θ, or a physical distance of (θ/360°)*T.

26. The linear hybrid brushless servo motor of claim 25, wherein the electrical angle ranges between +45° and −45°.

27. The linear hybrid servo brushless motor as of claim 1, further comprising at least one additional forcer adapted to operate with the platen to provide movement in at least two orthogonal directions.

* * * * *